(12) United States Patent
Jaasma

(10) Patent No.: US 8,905,006 B2
(45) Date of Patent: Dec. 9, 2014

(54) DIESEL ENGINE FOR A LPG-DIESEL MIXTURE

(71) Applicant: Vialle Alternative Fuel Systems B.V., Eindhoven (NL)

(72) Inventor: Servatius Alfons Maria Jaasma, Eindhoven (NL)

(73) Assignee: Vialle Alternative Fuel Systems B.V., Eindhoven (NL)

( * ) Notice: Subject to any disclaimer, the term of this patent is extended or adjusted under 35 U.S.C. 154(b) by 0 days.

(21) Appl. No.: 14/034,580

(22) Filed: Sep. 24, 2013

(65) Prior Publication Data

US 2014/0020658 A1    Jan. 23, 2014

Related U.S. Application Data

(63) Continuation of application No. PCT/NL2012/050229, filed on Apr. 5, 2012.

(30) Foreign Application Priority Data

Apr. 5, 2011    (NL) ...................................... 2006542

(51) Int. Cl.
| | |
|---|---|
| *F02M 21/02* | (2006.01) |
| *F02M 67/00* | (2006.01) |
| *F02D 19/06* | (2006.01) |
| *F02D 19/10* | (2006.01) |
| *F02D 19/08* | (2006.01) |
| *F02B 43/00* | (2006.01) |

(52) U.S. Cl.
CPC ........... *F02M 67/00* (2013.01); *F02D 19/0647* (2013.01); *F02D 19/0684* (2013.01); *F02D 19/10* (2013.01); *F02M 21/0287* (2013.01); *F02D 19/081* (2013.01); *Y02T 10/36* (2013.01); *Y02T 10/32* (2013.01); *F02D 19/0681* (2013.01); *F02D 19/0689* (2013.01); *F02D 19/0694* (2013.01)
USPC .......................................... 123/525; 123/575

(58) Field of Classification Search
USPC .............. 123/304, 525, 526, 527, 575, 27 GE
See application file for complete search history.

(56) References Cited

U.S. PATENT DOCUMENTS

| | | | | |
|---|---|---|---|---|
| 4,517,928 A | * | 5/1985 | Wolters | ..................... 123/27 GE |
| 2009/0032078 A1 | | 2/2009 | Gardiner et al. | |

FOREIGN PATENT DOCUMENTS

| | | | |
|---|---|---|---|
| DE | 102004011414 A1 | | 4/2005 |
| DE | 102008063278 A1 | | 7/2010 |
| FR | 2213686 A | * | 9/1974 |
| JP | 59162337 A | | 9/1984 |
| WO | 2009098728 A1 | | 8/2009 |

OTHER PUBLICATIONS

International Search Report for PCT/NL2012/050229 issued on Jul. 2, 2012.
International Preliminary Report of Patentability for PCT/NL2012/050229 issued on Oct. 8, 2013.

* cited by examiner

*Primary Examiner* — Mahmoud Gimie
(74) *Attorney, Agent, or Firm* — Knobbe, Martens, Olson & Bear LLP

(57) ABSTRACT

A diesel engine for combusting a diesel-LPG mixture includes a fuel system for supplying diesel and LPG. The mixture is obtained by combining the fuel flow from a LPG tank and diesel tank. Increased pressure is applied in both fuel flows for mixing purposes. Immediately following the mixing a circulation system is present in which increase in pressure also takes place, wherein a part of the mixture is supplied to a high-pressure pump for injection to the diesel engine and a part is recirculated. In a method of supplying the diesel-LPG mixture, the part of the mixture that is supplied to the high-pressure pump is returned to a position upstream of the mixing point. The pressure in the fuel system is higher downstream of the mixing point. When the LPG supply is switched off the pressure can be gradually decreased through circulation.

11 Claims, 2 Drawing Sheets

DIESEL ENGINE FOR A LPG-DIESEL MIXTURE

CROSS REFERENCE TO RELATED APPLICATIONS

This application is a continuation of PCT application number PCT/NL2012/050229 filed on 5 Apr. 2012, which claims priority from Netherlands application number 2006542 filed on 5 Apr. 2011. Both applications are hereby incorporated by reference in their entireties.

BACKGROUND OF THE INVENTION

1. Field of the Invention

The invention relates generally to a diesel engine comprising a direct injection injector arranged in the combustion chamber thereof and forming part of a fuel system which comprises a first storage for diesel fuel with a diesel supply conduit and an auxiliary diesel pump, a second storage for LPG with a LPG supply conduit, wherein these supply conduits are connected via a shared conduit to a shared high-pressure pump, wherein the outlet conduit of this high-pressure pump is connected to this injector and wherein a return conduit for fuel is present.

2. Description of the Related Art

Such a diesel engine is described in US 2009/0320786 A1, which is incorporated by reference herein in its entirety. Described herein is the mixing of diesel and LPG in a mixing chamber before it is injected via a common rail system. A return conduit is present here which operates downstream of the high-pressure pump.

The addition of LPG to diesel is interesting for various reasons. Firstly, in certain countries the fuel price of LPG, when calculated according to calorific value, is lower than that of diesel. It has moreover been found that admixing LPG decreases the emission of diesel engines. Particularly the soot emission decreases significantly.

The system described in US 2009/0320786 A1 is found not to be able to function under all conditions. There is a particular risk of transition from liquid LPG to the vapour phase at any location in the conduit system, whereby the dosing of LPG and/or the injection can no longer be accurately regulated in controlled manner. Accurate mixing of LPG and diesel has also been found to be important. This means that it is necessary to ensure under all conditions that the injected fuel always comprises substantially the same ratio of LPG to diesel. After all, if changes occur therein, this has immediate serious effects on both performance and emission.

Known from DE 10 2008 063 278 A1 is a diesel-LPG fuel system with a special mixing tank. The mixing tank is also connected to a return conduit of the injectors. A separate further return conduit connects the mixing tank to the LPG tank.

BRIEF SUMMARY OF THE INVENTION

It is an object of the invention to provide a fuel system with which it is possible to realize such an optimal mixing.

This object is realized in an above described diesel engine in that the shared conduit is a mixing conduit. That is, mixing of diesel and LPG takes place over a considerable path, which can ensure a homogeneous composition. It has been found that the mixing is realized comparatively quickly, so that no high standards need be set in respect of the length or embodiment of such a mixing conduit. In addition, a return conduit connects a part located downstream of the shared conduit to a diesel supply side. The diesel supply side can be the diesel supply conduit, the auxiliary diesel pump or the diesel supply. This enables circulation of fuel, even of mixed fuel, wherein the returned fuel is mixed with the supplied or stored diesel.

In a preferred embodiment this return conduit is located between this shared conduit and the inlet of this auxiliary diesel pump, and the auxiliary diesel pump is hereby also located downstream of the shared conduit. Mixed fuel is hereby supplied to the auxiliary diesel pump.

According to a further advantageous embodiment of the present invention, the connection of the diesel supply conduit to the LPG supply conduit is realized downstream of the auxiliary LPG pump.

According to a further variant of the present invention, an auxiliary LPG pump is arranged in this LPG supply conduit.

According to the present invention the liquid phase of LPG is guaranteed under all conditions by arranging an auxiliary LPG pump. This can be situated at any location in the LPG supply conduit, although it is preferably arranged in the LPG tank. Because the pressure is thereby increased in the whole fuel system, the occurrence of vapour bubbles is precluded, even at the raised temperature which can prevail in the engine space. Such a pump is preferably embodied such that the pressure increase is limited as far as possible thereby. In other words the LPG pump provides only a small increase in pressure, and the pumped LPG downstream from the pump is only at a very slightly higher pressure than the LPG upstream from the pump (e.g. LPG in the tank). Such a pressure increase has on the one hand to be such that formation of vapour bubbles is prevented in guaranteed manner under the prevailing conditions. The pressure must on the other hand be low such that particularly the inlet pressure at the high-pressure pump for the mixture feeding the common rail is as low as possible, this in order to prevent damage to the different components on the inlet side of such a common rail pump. It is moreover possible to arrange, downstream of such an auxiliary LPG pump but upstream of the above described mixing conduit, a controllable valve with which the mixing ratio between diesel and LPG can be controlled and the pressure can be prevented from possibly rising too high.

According to the present invention it is already possible to bring LPG and diesel into optimally mixed state immediately upstream of the inlet of the high-pressure or common rail pump. It is hereby possible to guarantee that a homogenous mixture is injected into the relevant combustion space under all conditions.

The circulation system is moreover optimized, whereby the occurrence of vapour bubbles can be prevented or in any case the effect thereof limited. In contrast to the prior art, the return conduit is for this purpose not arranged downstream of the high-pressure pump but directly upstream thereof. In an embodiment the return conduit is coupled to the low-pressure part of the high-pressure pump. According to the present invention such a return conduit debouches upstream of the auxiliary diesel pump. A diesel-LPG mixture with a low admixture percentage can thus be fed back to a position upstream of the auxiliary diesel pump.

Connected to the injector according to a further advantageous embodiment of the invention is a leakage conduit through which a comparatively small flow occurs and which is connected to the above described return conduit. In a multi-cylinder engine or when a plurality of injectors are used per cylinder a corresponding number of leakage conduits can be present.

It is conventional to start with pure diesel fuel, i.e. without feed of LPG, therefore LPG has to be removed from the system when the engine is switched off. Since, according to the present invention, the pressure in the system is increased due to the use of an auxiliary LPG pump, the LPG added to the mixture will generally have a higher pressure than the diesel fuel supplied to the mixture. Stated by way of example is a value of the LPG pressure of about 8 bar, while the diesel has a pressure of about 4 bar. This does not cause problems during mixed operation. The pressure differences however cause problems when switching off and starting again with only a fuel such as diesel.

According to a further aspect of the present invention, such a problem can be avoided in that there is arranged in the shared conduit in which diesel and LPG are present a circulation circuit consisting of a circulation pump and circulation conduit arranged between inlet and outlet of this pump. When the LPG supply is switched off, remaining LPG is continuously mixed due to the circulation with the diesel still being supplied, and decrease in pressure can take place in controlled manner. In one embodiment, a shut-off valve can be incorporated in the circulation circuit in order to activate and deactivate the circuit. Activation and deactivation can depend particularly on whether startup is hot/cold.

In another embodiment, one or more fuel volumes in which a quantity of fuel can be temporarily received are incorporated in the circulation circuit. These fuel volumes can be more than 50 cc, in particular more than 100 cc. During diesel operation a fuel volume received in the diesel supply conduit forming part of the circulation circuit can particularly collect pure fuel in the fuel volume. When the circulation circuit is activated, for instance in the case of a hot start, a Raoult effect can then occur. The LPG present in the mixing conduit can be distributed via the circulation circuit over a large volume, and particularly also in the fuel volume. The excess of diesel present considerably reduces the vapour pressure of the LPG, whereby a diesel restart is possible.

If the volume downstream of the pump is at least 50 cc, this being understood to mean the volume of the circulation conduit, such a reduction can take place with a pressure decrease as the LPG expands.

According to a further advantageous embodiment, wherein the above described circulation is applied, a part of the diesel supply conduit and the circulation conduit is a single conduit.

The invention also relates to a method for operating a diesel engine on a mixture of LPG and diesel, wherein diesel and LPG are mixed and, after being mixed, injected with a high-pressure pump into a diesel engine, wherein the supply of LPG to the diesel can be switched off, wherein the mixture of diesel and LPG is brought to a higher pressure downstream of the mixing point thereof, and a part of the mixture is supplied to this high-pressure pump and a part of the mixture is recirculated to the mixing point. In addition, a sub-part of the mixture supplied to the high-pressure pump is returned to a position upstream of the mixing point. Not only is mixed fuel hereby returned, the mixing is also further improved.

The sub-part is particularly returned to a position upstream of an auxiliary diesel pump.

BRIEF DESCRIPTION OF THE DRAWINGS

The features and advantages of the invention will be appreciated upon reference to the following drawings, in which.

DESCRIPTION OF ILLUSTRATIVE EMBODIMENTS

Figure 1:
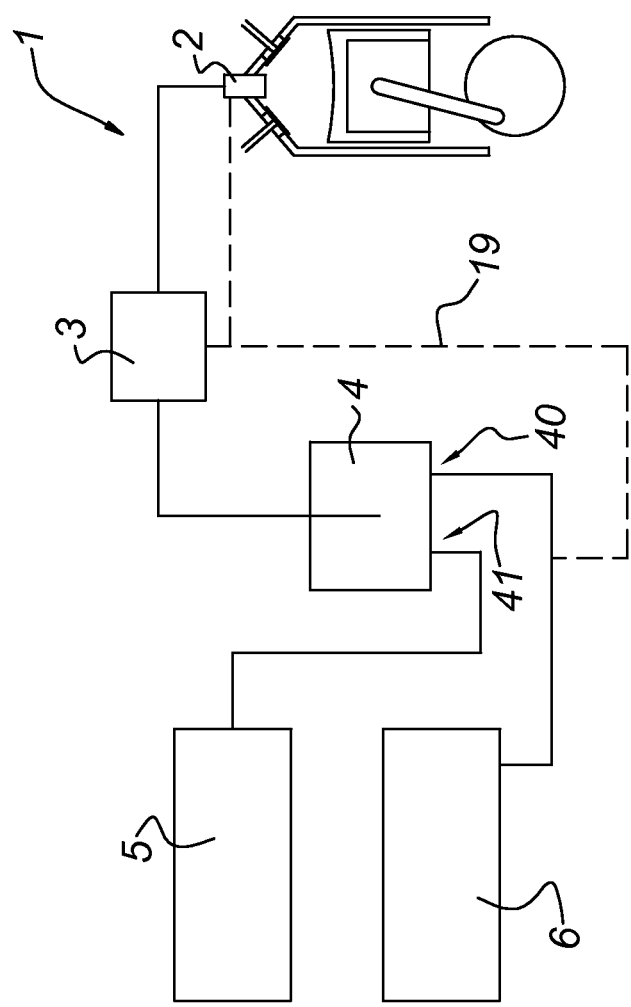
FIG. 1 is shows schematically a diesel engine provided with the fuel system according to the invention.

The following is a description of certain embodiments of the invention, given by way of example only and with reference to the drawings. The diesel engine 1 can be embodied in any way known in the prior art, and is optionally provided with a compressor (driven by exhaust gases).

An injector present in the cylinder head is designated with 2 and a fuel or fuel mixture is introduced into the combustion space by the injector using a high-pressure pump. Such a high-pressure pump can increase the pressure considerably to at least 1000 bar and can comprise any high-pressure pump known in the prior art. The engine shown here can be a single or multi-cylinder engine.

Arranged upstream of the high-pressure pump is a housing 4 which will be further described with reference to FIG. 2. Designated with 5 is a LPG tank in which LPG is stored under pressure in (partially) liquid state. A pressure-free storage tank for diesel is designated with 6. Housing 4 comprises a unit with a number of conduits which makes possible the connection including circulation circuit 23 according to the invention. This housing 4 can be easily built into existing diesel engines.

During conversion one inlet 40 of housing 4 is connected to the existing diesel conduit, in particular the diesel conduit downstream of auxiliary diesel pump 8. Gas tank 5 is connected to another inlet 41 of housing 4. An outlet 43 of housing 4 is connected to the conduit which supplies fuel to high-pressure pump 3.

Figure 2:
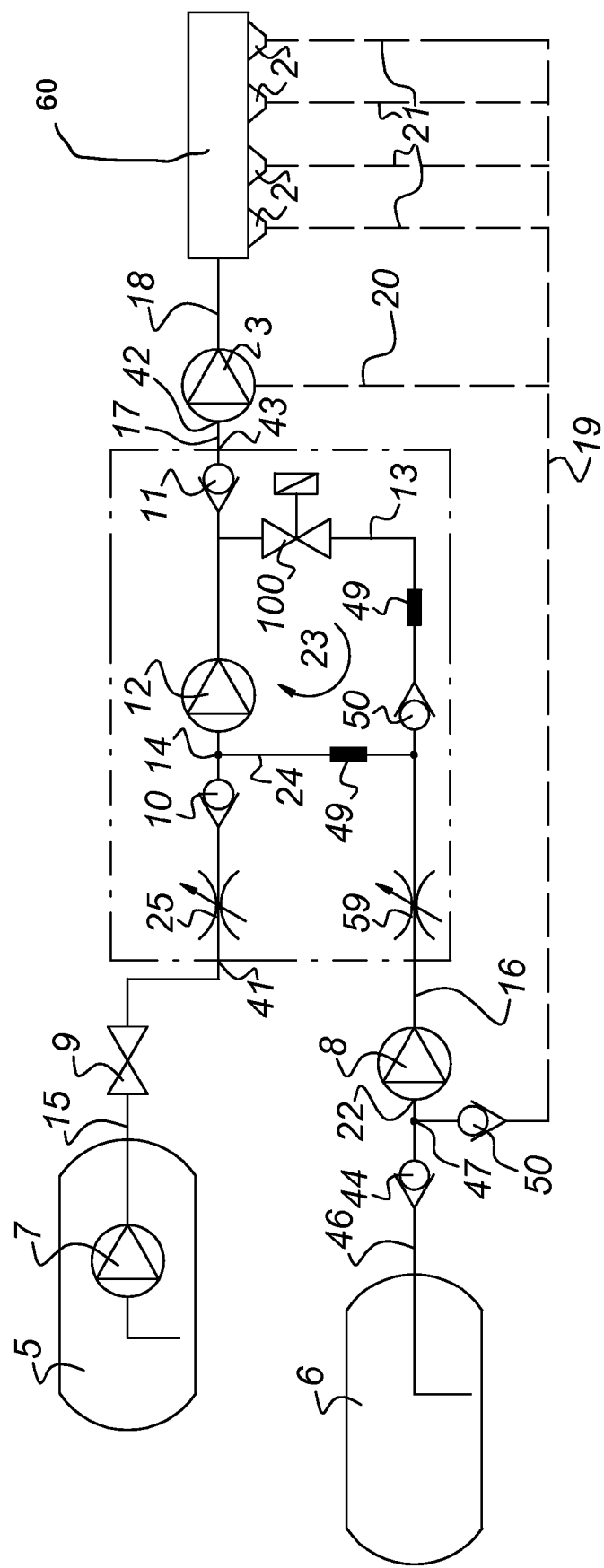
FIG. 2 shows schematically the fuel system according to the invention.

The above described construction is further elucidated in FIG. 2 in respect of the fuel system. Injectors 2 are connected to a common rail 60 which receives its pressure from high-pressure pump 3 via conduit 18. Leakage conduits 21 connect the injectors (or common rail) to return conduit 19.

A diesel supply conduit 16 extends from diesel tank 6 to housing 4. An auxiliary diesel pump 8 is present which increases the fuel pressure at inlet 22 thereof from atmospheric pressure to for instance 4 bar.

The diesel tank 6, the auxiliary diesel pump and the diesel supply conduit 16 form the diesel supply side according to this application. The diesel supply side is any part lying upstream of diesel inlet 40.

LPG is stored in a pressure tank 5 in which is also situated an auxiliary LPG pump 7 which is arranged in a LPG supply conduit 15. The pressure is hereby increased by 2 to 4 bar to for instance 8-10 bar. This pressure can optionally be varied depending on the ambient temperature and/or the composition of the LPG (butane-propane ratio). A shut-off valve 9 is present in LPG supply conduit 15, followed by a one-way valve 10. These two components are present inside unit 4, as is an optionally controllable throttle valve designated with 25 which reduces the pressure from for instance 8 bar to for instance 4 bar, and more particularly 1.5-2 bar, in order to optimize the process of mixing diesel and LPG.

The controllable throttle valve 25 is adapted to control the amount of LPG to be supplied. Throttle valve 25 is connected to a controller (not shown). In the case of a hot start the throttle valve 25 can be completely closed so that a hot start takes place solely with diesel supply. A controllable throttle valve 59 is incorporated in diesel supply conduit 16. Throttle valves 25,59 are adapted to co-act with each other in inversely proportional manner, wherein the combined opening (total flow rate) of throttle valves 25,59 corresponds to the returned mixture volume and the actually consumed volume of mixture.

LPG supply conduit 15 is connected at point 14 to diesel supply conduit 16. From here a shared conduit 17 extends as seen in the flow direction to inlet 20 of the high-pressure pump.

Extending from the inlet of the high-pressure pump is a return conduit 19 which debouches at the inlet of diesel supply pump 8.

The above described device operates as follows:

During "normal" operation both diesel and LPG will be supplied to the shared conduit 17. The mixing ratio is defined by, among other factors, the effect of throttle valve 25, which is optionally electrically adjustable. Such an adjustability can for instance be realized with a feedback system which determines inter alia the properties of the fuels used, the emission or other operational parameters and carries out an adjustment on the basis thereof. One of the variables to be measured is the system pressure, on the basis of which the composition of the mixture can be determined. Diesel and LPG come together in the desired quantity at mixing point 14 and are pumped using circulation pump 12. Adjustment of the position of the throttle valve 100 can result in a reduction of the LPG pressure during mixing. This is because the diesel fuel is at a pressure which is lower than the pressure generated by pump 7 and which is for instance 4 bar or lower.

During the pumping by circulation pump 12 a part of the fuel moves via shared conduit 17 across a non-return valve 11 to inlet 42 of the high-pressure pump. Another part branches off and is circulated as indicated with arrow 23 via circulation conduits 13 and 24. The fuel here passes through non-return valve 50. A fuel volume 49 can be incorporated here in the circulation conduits. An excess of diesel is present in the fuel volume, whereby mixing of the LPG with the diesel is further improved.

A part of the fuel supplied to inlet 42 of the high-pressure pump is fed back via conduit 20 to the diesel supply side, and in particular to inlet 22 of diesel supply pump 8. In a particular embodiment conduit 20 is connected to the low-pressure side of high-pressure pump 3. This can be an open and direct connection. A hydraulic resistance can be incorporated in conduit 20.

It is likewise possible to connect return conduit 19 downstream of pump 8. The temperature or other conditions in the system, and more particularly in pump 3, can hereby be controlled, whereby vapour bubble formation can be prevented.

Respective non-return valves 44,45, with which the flow direction of the fuels is determined, can be received close to node 47 in the diesel conduit 46 from tank 6 and in return conduit 19.

In contrast to LPG-petrol engines, such a system can in principle be started on a LPG-diesel mixture. The operation and embodiment of circulation pump 12 is chosen here such that it causes no or hardly any pressure increase but ensures circulation in the above described conduits. The pressure of the mixture provided at the inlet of pump 3 can hereby be comparatively low, i.e. preferably 4 bar or lower.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A diesel engine comprising a direct injection injector arranged in the combustion chamber thereof and forming part of a fuel system which comprises a first storage for diesel fuel with a diesel supply conduit and an auxiliary diesel pump, a second storage for LPG with a LPG supply conduit, wherein the supply conduits are connected via a shared conduit to a shared high-pressure pump, wherein the outlet conduit of the high-pressure pump is connected to the injector and wherein a return conduit for fuel is present, wherein the shared conduit is a mixing conduit, and wherein the return conduit is arranged between the shared conduit and a position upstream of the inlet of the auxiliary diesel pump.

2. The diesel engine according to claim 1, wherein an auxiliary LPG pump is arranged in the LPG supply conduit and the diesel supply conduit is connected downstream of the auxiliary LPG pump to the LPG supply conduit via the shared conduit.

3. The diesel engine according to claim 1, wherein a leakage conduit connected to the return conduit is connected to the injector.

4. The diesel engine according to claim 1, further comprising: a circulation circuit comprising a circulation pump arranged in the shared conduit, and a circulation conduit arranged between the inlet and outlet of the circulation pump.

5. The diesel engine according to claim 4, wherein the conduit volume of the circulation pump and the circulation conduit is at least 40 cc.

6. The diesel engine according to claim 1, wherein a shut-off valve is arranged in the LPG supply conduit.

7. The diesel engine according to claim 4, wherein the circulation pump and circulation conduit are arranged in a unit.

8. The diesel engine according to claim 4, wherein a part of the diesel supply conduit and a part of the circulation conduit comprises a conduit part.

9. A method for operating a diesel engine on a mixture of LPG and diesel, the method comprising the steps of:
supplying LPG to a diesel supply at a mixing point to form a mixture of LPG and diesel;
bringing the mixture to a higher pressure downstream of the mixing point;
supplying a part of the mixture to a high-pressure pump for injection into a diesel engine, and
recirculating at least a part of the other part to the mixing point;
wherein the part of the mixture supplied to the high-pressure pump is returned to a position upstream of the mixing point.

10. The method as claimed in claim 9, wherein a sub-part of the part of the mixture supplied to the high-pressure pump is recirculated upstream of the high-pressure pump.

11. The method as claimed in claim 10, wherein a diesel storage and an auxiliary diesel pump are present, and wherein the sub-part of the mixture is supplied to the inlet of the auxiliary diesel pump.

* * * * *